United States Patent [19]

Lewis, III et al.

[11] Patent Number: 4,487,588

[45] Date of Patent: Dec. 11, 1984

[54] SUBMERSIBLE RAFT FOR THE CULTIVATION OF PLANT LIFE

[75] Inventors: Roy R. Lewis, III, Tampa; James A. Derrenbacker, Jr., Lutz, both of Fla.

[73] Assignee: Mangrove Systems, Inc., Tampa, Fla.

[21] Appl. No.: 406,773

[22] Filed: Aug. 10, 1982

[51] Int. Cl.³ .............................................. B63C 9/04
[52] U.S. Cl. ......................................... 441/43; 47/59; 441/45
[58] Field of Search ................. 47/59, 60, 65, 61, 63, 47/64; 441/35, 43, 44, 45; 206/557, 558

[56] References Cited

U.S. PATENT DOCUMENTS

| | | | |
|---|---|---|---|
| 850,847 | 4/1907 | Petrie | 441/44 |
| 1,107,632 | 8/1914 | Tabulo | 441/44 |
| 1,669,057 | 5/1928 | Katzinger | 206/557 X |
| 2,283,472 | 5/1942 | Tuxhorn | 119/3 |
| 3,420,431 | 1/1969 | Donovan | 206/557 X |
| 4,086,725 | 5/1978 | Kwang Li | 47/61 |

*Primary Examiner*—Sherman D. Basinger
*Attorney, Agent, or Firm*—Frijouf, Rust & Pyle

[57] ABSTRACT

A submersible raft is disclosed for the cultivation of plant life such as seagrasses or the like. The submersible raft includes a first and a second longitudinal member of tubular configuration. The first and the second longitudinal members each have a first and a second end. A first transverse member extends between the first ends of the first and the second longitudinal members and a second transverse member extends between the second ends of the first and the second longitudinal members. The first and second longitudinal members and the first and second transverse members define a rectangular aperture therebetween. Tray supporting cradles extend between and are supported by the first and the second longitudinal members, the trays being supported below the rectangular aperture such that in use of the raft, pots of plant life to be cultivated are supported below the surface of the water in which the raft is submersed.

31 Claims, 7 Drawing Figures

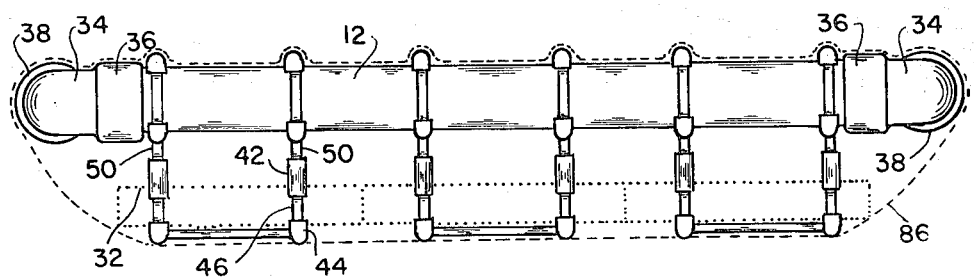
FIG. 3
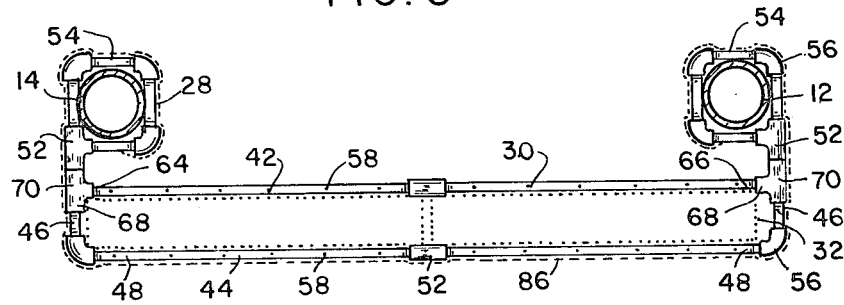
FIG. 4
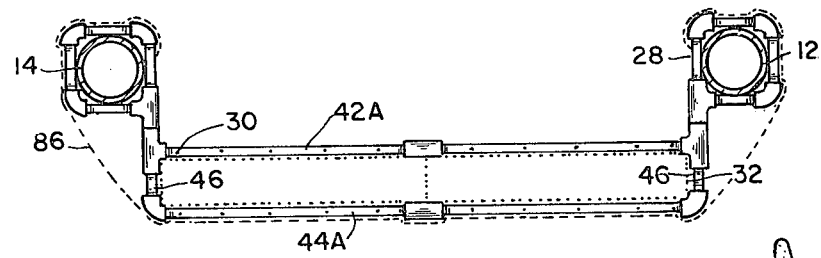
FIG. 5
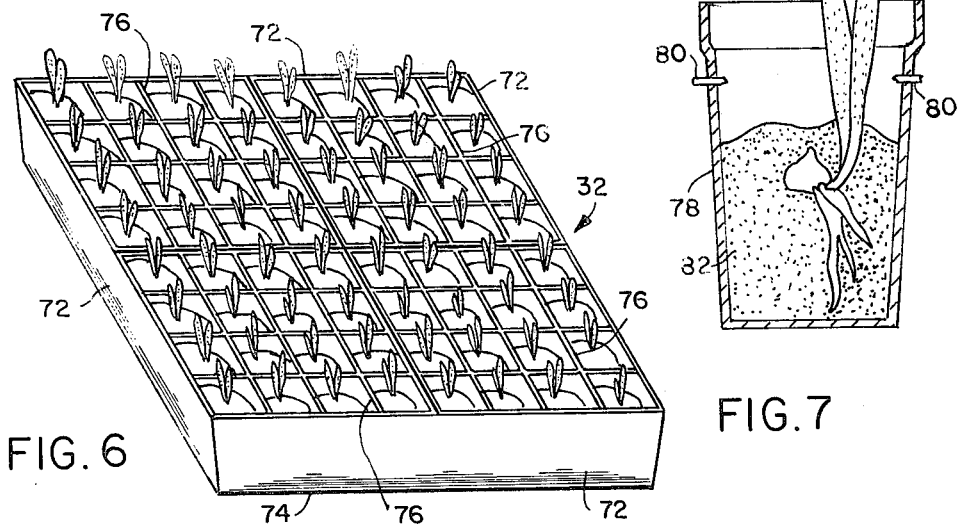
FIG. 6
FIG. 7

SUBMERSIBLE RAFT FOR THE CULTIVATION OF PLANT LIFE

BACKGROUND OF THE INVENTION

1. Field of the Invention

This invention relates to a submersible raft for the cultivation of plant life.

2. Description of the Prior Art

For many decades, much attention has been paid to the dangers and disastrous consequences of cutting down foliage from the countryside. Such widespread denudation of the land has resulted in erosion of precious topsoil with not only loss of valuable vegetation but also an imbalance in the insect and mammal life that were dependent upon such vegetation for continued existence.

Although the evils of soil erosion are well understood and documented, a parallel situation has existed with regard to the destruction of marine vegetation. Such destruction of aquatic plants has resulted from dredging activities, coastal developments, heated water effluents and oil pollution. The term aquatic plants includes seagrasses which are flowering submerged plants and algae which are non-flowering plants otherwise known as angiosperms. The consequences of such destruction of sea grasses, although not as readily apparent as the effects of the destruction of land vegetation, have been documented by various authors. For example, J. L. Taylor and C. H. Solomon, in an article entitled "Some Effects of Hydraulic Dredging and Coastal Development in Boca Ciega Bay, Florida", published in *Fish Bulletin*, 1968, Volume 67, Page 213, outlines the adverse effects of such loss of marine vegetation.

M. F. Godcharles in a Florida Department of Natural Resources Divison of Maritime Research Technical Services paper published 1971, Volume 64-1, brought these problems to light in the paper being entitled "A Study of the Effects of a Commercial Hydraulic Clam Dredge on Benthic Communities in Estuarine Areas".

A further reference work on the dangers to seagrasses brought about by pollution is entitled "Tropical Seagrass Ecosystems and Pollution in Tropic Marine Pollution". This discussion by J. D. Ziemen appears in the Wood & Johannes edition of *Elsevier Oceanographer*, Series 12-64, published 1975.

Research is under way into methods of restoring such endangered seagrasses particularly in view of the effect such seagrasses have on the cycling of nutrients, sediment stabilization and providing the necessary nursery and shelter habitats for a diversity of both plant and animal species.

The benefits derived from such restorative efforts is emphasized by C. P. McRoy and C. Helfferich in *Applied Aspects of Seagrasses*, a handbook of seagrass biology and by R. C. Phillips and C. P. McRoy, *An Ecosystem Perspective*, Garland STPM Press, Inc., New York, 1980, page 297.

In addition to the above, C. G. J. Patterson and P. Boysen-Jensen relate the value of such restoration of seagrasses in "Valuation of the Sea in Animal Life of the Sea Bottom, Its Food and Quantity", reproduced from *Danish Biology*, Volume 20-1, published 1911.

Referring more particularly to an area of cultivation that has been acclaimed by public and scientific committees, seagrasses that have received a certain amount of attention are *Thalassia testudinum* and *Halodule wrightii*, hereinunder referred to as Thalassia and Halodule, respectively.

A report of a Steering Committee of Seagrass Ecosystems Study was published in 1973 drawing attention to various problems associated with successful cultivation of seagrasses. Most of these studies as reported were relative to the laboratory cultivation of such seagrasses as Thalassia and it is to be noted that only marginal success was attained in these cultivation attempts.

Several prior proposals have been put forward for transplanting seagrasses from an indigenous meadow otherwise called a donor site. During one such study entitled "Restoration of Seagrasses with Economic Analysis" by A. Thorhaug and Austin published in *Environmental Conservation*, volume 3-259, published 1976, the Thalassia seeds were recovered and later used to develop by nursery-type procedures, the holding and developing of transplant stock for later use in the field.

Utilizing such transplant techniques, efforts have been made particularly in the Biscayne Bay area of Florida to use such transplant stock, Thalassia and Halodule. These transplants have been made by virtue of anchors of iron attached to such plants. Although such transplantation met with initial failure, recent experiments have met with much success. Nevertheless, the cost of such procedures has proven prohibitive.

For example, the cost of transplanting plugs of eelgrass in North Carolina averaged $76,545 per acre. In Long Island Sound, eelgrass sprigs were planted at less than 1 meter depth at a cost of $12,775 per acre.

In Florida, Thalassia seedlings were planted at variable costs depending on the time required to obtain the desired cover. To obtain a coverage of 2,000 blades per square meter within 0.8 years, the cost was as high as $56,487 per acre.

Because of these high costs and the resultant damage experienced by the donor site during removal of plants to be transplanted, such cultivation procedures have left much to be desired.

The present invention seeks to overcome the aforementioned inadequacies of the prior art by the provision of a system whereby plant life such as seagrass seeds can be grown using peat pellet techniques. The seeds are cultivated in pots containing these peat pellets, the pots being located within trays supported by a submersible raft anchored at the cultivation site.

U.S. Pat. No. 2,283,472 to Tuxhorn, discloses an apparatus for establishing fish habitats. This specification describes a float that rises and falls with the level of water in a lake. A submergible floating raft like structure is disclosed for supporting soil, rocks and materials necessary for growth of aquatic plants. However, this raft is not reusable.

Although the aforementioned patent solves many of the needs of the prior art for the cultivation of aquatic plants, this structure is relatively complex in construction and costly to manufacture. Therefore, it is a primary object of this invention to provide a submersible raft that overcomes the inadequacies of the prior art structure and provides an improvement which significantly contributes to the low cost of manufacture of a submersible raft.

Another object of the present invention is to provide a simple submersible raft that can easily be manufactured from standard polyvinyl chloride tubing and fittings.

Another object of the invention is to provide a submersible raft which supports a plurality of pots for the propagation of aquatic plants from seeds.

Another object of the present invention is the provision of a submersible raft which is reusable.

Another object of the invention is the provision of means for locking seed pot carrying trays relative to the submersible raft.

Another objective of the present invention is the provision of a sheet of netting which encompasses the submersible raft so that the formation of algae on the seed pots is inhibited.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention within the scope of the invention. Particularly with regard to the use of the invention disclosed herein, this should not be construed as limited to submersible rafts for the cultivation of aquatic plants, but should include rafts for the propagation of other forms of life within the aquatic environment.

SUMMARY OF THE INVENTION

The submersible raft of the present invention is defined by the appended claims with a specific embodiment shown in the attached drawings. For the purpose of summarizing the invention, the invention relates to a submersible raft for the cultivation of plant life or the like. The submersible raft comprises a first longitudinal member of tubular configuration and a second longitudinal member of tubular configuration with both the first and the second longitudinal members having a first and a second end. A first transverse member extends between the first ends of the first and second longitudinal members whereas a second transverse member extends between the second ends of the first and second longitudinal members. The first and the second longitudinal members and the first and second transverse members define a substantially rectangular aperture therebetween. A cradle extends between and is supported by the first and second longitudinal members with a tray being supported by the cradle below the rectangular aperture.

In a more specific embodiment of the invention, the submersible raft includes a cradle which slidably engages the first and second longitudinal members. The first and second longitudinal members and the first and second transverse members are extruded polyvinyl chloride tubing joined together by right angle tubular members. The cradle is of extruded polyvinyl chloride tubing joined together by a plurality of "T" shaped and "L" shaped connectors and includes an upper framework and a lower framework, both of "H" shaped configuration. The upper and lower frameworks are parallel and separated by upright members which extend between the free ends of the upper and lower "H" shaped frameworks. Each upright member has an extension which extends upwardly of the upper framework and is joined to a loop shaped member which encircles and slidably engages one of the longitudinal members. The tubular sections of the cradle are drilled so that the cradle will fill with water and sink in use of the submersible raft. The raft is dimensioned to support three cradles, each cradle accommodating two trays in the opening between the upper and lower frameworks, respectively. Each one of the trays includes four solid side walls and an imperforate base for supporting four units, each unit including 16 pots. The pots within a unit are stapled to each adjacent pot within their unit. The whole structure of the submersible raft is encompassed by a sheet of netting.

The foregoing has outlined rather broadly the more pertinent and important features of the present invention in order that the detailed description of the invention that follows may be better understood so that the present contribution to the art can be more fully appreciated. Additionally, features of the invention will be described hereinafter which form the subject of the claims of the invention. It should be appreciated those skilled in the art that the conception and specific embodiment described may be readily utilized as a basis for modifying or designing other devices for carrying out the same purpose as the present invention. It should also be realized by those skilled in the art that such equivalent constructions do not depart from the spirit and scope of this invention as set forth in the appended claims.

BRIEF DESCRIPTION OF THE DRAWINGS

For a fuller understanding of the nature and objects of the invention, reference should be had to the following description taken in conjunction with the accompanying drawings in which:

FIG. 3 is a side elevational view of the raft of FIG. 1;

FIG. 4 is an end elevational view of the raft of FIG. 1;

FIG. 5 is an end elevational view of an alternative embodiment of the present invention;

FIG. 6 is a perspective view of a tray supported by the raft of FIG. 1;

FIG. 7 is an elevational cross sectional view of a peat pot contained with the tray of FIG. 6.

Similar reference characters refer to similar parts throughout the several views of the drawings.

DETAILED DESCRIPTION

Figure 1:
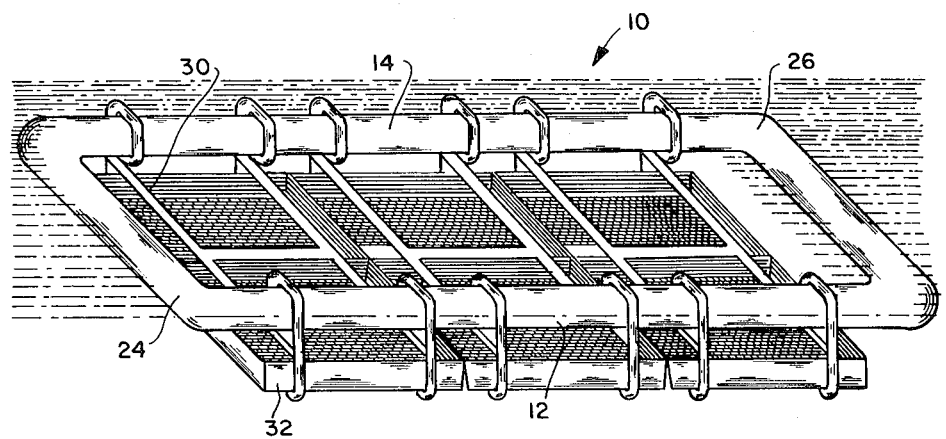
FIG. 1 is a perspective view of the submersible raft of the present invention.

FIG. 1 is a perspective view of a submersible raft generally designated 10, for the cultivation of seagrass. The submersible raft 10 comprises a first longitudinal member of tubular configuration 12 and a second longitudinal member 14, also of tubular configuration. The first longitudinal member 12 has a first end 16 and a second end 18. Similarly, the second longitudinal member 14 has a first end 20 and a second end 22. A first transverse member 24 extends between the first ends 16 and 20, respectively, of the first and second longitudinal members 12 and 14, respectively. A second transverse member 26 extends between the second ends 18 and 22, respectively, of the first and second longitudinal members 12 and 14, respectively, so that the longitudinal members 12 and 14 and the transverse members 24 and 26 together define a substantially rectangular aperture 28 therebetween.

Three identical cradles, one of which is generally designated 30, extends between and is slidably supported by the first and second longitudinal members 12 and 14, respectively. Each cradle supports two trays, one of which is generally designated 32, to be described in more detail hereinafter with reference to FIG. 6.

Figure 2:
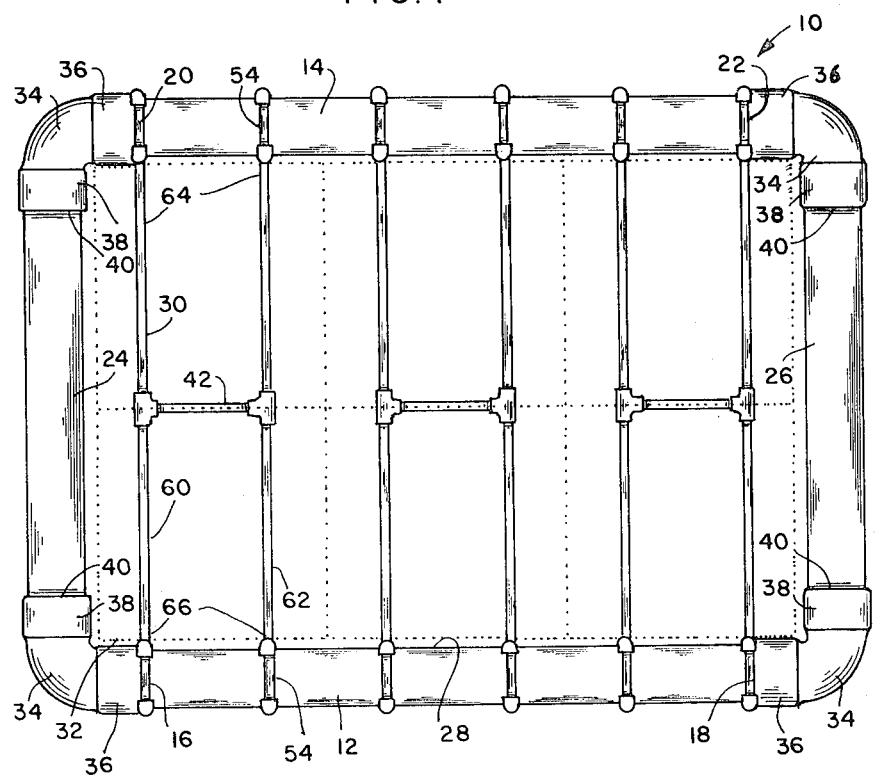
FIG. 2 is a plan view of the raft of FIG. 1.

Referring more particularly to FIG. 2 of the drawings, the first and second ends 16, 20 and 18, 22, respectively, of the longitudinal members 12 and 14, respectively, are secured relative the transverse members 24 and 26, respectively, by means of right angle tubular members 34. Each one of the four right angle tubular members 34 includes a first socket 36 and a second socket 38. The respective first and second ends 16, 20 and 18, 22 of longitudinal members 12 and 14 are connectably secured within the first sockets 36 of the right angle tubular members 34. The terminations 40 of the respective transverse members 24 and 26 are connectably secured within the second sockets 38 of the right angle tubular members 34. The longitudinal members 12 and 14 and the transverse members 24 and 26 may be extruded four inch diameter polyvinyl chloride tubing of circular transverse cross section. The right angle tubular members 34 may be standard four inch polyvinyl chloride right angle bends and may be connectably secured to the longitudinal and transverse members by means of silicon based polyvinyl chloride cement. The dimensions of the submersible raft may be five feet long by four feet wide.

FIGS. 3 and 4 show in more detail the construction of the cradle 30. The cradle 30 is constructed preferably from sections of half inch diameter standard polyvinyl chloride extruded tubing. The cradle 30 includes an upper framework 42 of "H" shaped configuration and a lower framework 44, also of "H" shaped configuration. The upper and lower frameworks 42 and 44, respectively, are of the same proportions and are parallel to each other and separated from each other by means of upright members 46 which extend upwardly between the correspondingly free ends 48 of the upper and lower frameworks 42 and 44, respectively. Each one of the four upright members 46 has an extension 50 shown more clearly in FIG. 3 which extends upwardly from the upright member to above the upper framework 42. The top end of each one of the extensions 50 is connected by means of "T" shaped connectors 52 to loop shaped members 54 which slidably engage and are supported by the longitudinal members 12 and 14, respectively. The upper and lower frameworks 42 and 44, respectively, the upright members 46, the extensions 50 and the loop shaped members 54 are fabricated from extruded half inch diameter polyvinyl chloride tubing sections connected together by means of "T" shaped connectors 52 and "L" shaped connectors 56. The various polyvinyl chloride tubing sections of the cradle 30 define drilled apertures 58 such that in use of the submersible raft the cradles 30 will sink relative to the longitudinal members 12 and 14.

The upper framework generally designated 42 includes a first removable elongated tubular locking section 60 and a second removable elongated tubular locking section 62 shown more particularly in FIG. 2. Opposed ends 64 and 66 of locking sections 60 and 62, respectively, are receivably engaged within socket portions 68 of lower "T" shaped connectors 70 shown in FIG. 4.

In an alternate embodiment of the present invention as shown in FIG. 5, the "H" shaped frameworks 42a and 44a are shorter than the "H" shaped frameworks 42 and 44, respectively, of the embodiment shown in FIG. 4. In the alternate embodiment shown in FIG. 5, the length of the "H" shaped frameworks 42a and 44a is less than the distance between the longitudinal axes of the longitudinal members 12 and 14, respectively. In the embodiment shown with reference to FIG. 4, the length of the "H" shaped frameworks 42 and 44 is greater than the distance between the longitudinal axes of the longitudinal members 12 and 14, respectively.

The tray 32 is shown more particularly with reference to FIG. 6 and includes four solid side walls 72 and a perforate base 74. The tray which may be square in plan view, supports four units 76, each unit 76 containing 16 peat seed pots 78 shown in more detail in FIG. 7. Each peat pot 78 within a unit 76 is stapled to an adjacent pot by means of staples 80. Each peat pot is filled with a peat pellet 82 sold under the registered trademark "Jiffy 7 Wafers" supplied by Universal Enterprises Supply Corporation. FIG. 7 shows a propagated seagrass plant 84 including root and leaf system.

As an alternative to the aforementioned "Jiffy 7 Wafers", growing mediums sold under the Reg. Trademark "Oasis Horticubes" have been used with success in combination with the submersible raft of the present invention. Growing mediums of the type sold under the Reg. Trademark "Oasis Horticubes" are of the peak block type.

A fiberglass sheet of netting 86 encompasses the submersible raft and serves the purpose of inhibiting the growth of algae around the trays and the peat pots.

In use of the submersible raft, the locking sections 60 and 62 of each cradle are pulled out of the respective socket portions 68 of the lower "T" shaped connectors 70 and two trays, each filled with 64 peat pots, are lowered onto the lower framework of the cradle 30. The locking sections 60 and 62 are then replaced in the socket portion 68 and the whole submersible raft is encompassed by the sheet of netting 86. Usually the raft floats with the four inch polyvinyl chloride tubes little less than half submerged. The depth of the lower framework 44 is approximately one foot from the top of the submersible raft and therefore the plants grow approximately six to eight inches under the surface of the water.

The submersible raft of the present invention provides a low cost system for the cultivation of aquatic plants. The raft is of extremely simple construction and may be fabricated from standard extruded polyvinyl chloride tubing and fittings.

The present disclosure includes that contained in the appended claims as well as that of the foregoing description. Although this invention has been described in its preferred form with a certain degree of particularity, it is to be understood that the present disclosure of the preferred form has been made by way of example and that numerous changes in the details of construction and the combination and arrangement of parts may be resorted to without departing from the spirit and scope of the invention.

What we claim is:

1. A submersible raft for the cultivation of plant life comprising in combination:
   a first longitudinal member of tubular configuration;
   a second longitudinal member of tubular configuration;
   said first longitudinal member including a first and a second end;
   said second longitudinal member including a first and a second end;
   a first transverse member extending between said first ends of said first and said second longitudinal members;

a second transverse member extending between said second ends of said first and said second longitudinal members;

said first and said second longitudinal members and said first and said second transverse members defining a substantially rectangular aperture therebetween, said first and said second longitudinal members being of plastics material;

a cradle extending between and supported by said first and said second longitudinal members, said cradle including an upper and a lower framework, said upper and said lower frameworks being of H-shaped configuration and of substantially the same proportions as each other;

upright members extending between corresponding free ends of said H-shaped frameworks;

extensions of said upright members extending upwardly from said upper frameworks;

a loop shaped member connected to each of said extensions, said loop shaped member encircling one of said longitudinal members such that said loop shaped member and said cradle are moveable longitudinally relative to said rectangular aperture; and a tray supported by said cradle, said tray being supported below said rectangular aperture, said tray being supported between said upper and said lower frameworks which define therebetween an opening for the reception of said tray.

2. A submersible raft as set forth in claim 1 wherein said first and said second longitudinal members are substantially circular in transverse cross section.

3. A submersible raft as set forth in claim 1 wherein said first and said second longitudinal members are of extruded polyvinyl chloride.

4. A submersible raft as set forth in claim 1 wherein each of said first and said second ends of said first and said second longitudinal members is connected to said first and said second transverse members, respectively, by means of a right angle tubular member.

5. A submersible raft as set forth in claim 4 wherein each of said right angle tubular members includes a first and a second socket.

6. A submersible raft as set forth in claim 5 wherein said first socket connectably receives one end of one of said longitudinal members and said second socket connectably receives a termination of one of said transverse members.

7. A submersible raft as set forth in claim 1 wherein said first and said second transverse members are of tubular configuration.

8. A submersible raft as set forth in claim 7 wherein said first and said second transverse members are substantially circular in transverse cross section.

9. A submersible raft as set forth in claim 8 wherein said first and said second transverse members are of plastics material.

10. A submersible raft as set forth in claim 9 wherein said first and said second transverse members are of extruded polyvinyl chloride.

11. A submersible raft as set forth in claim 1 wherein said first and said second longitudinal members are longer than the said first and said second transverse members.

12. A submersible raft as set forth in claim 1 wherein said cradle includes four upright members, each of said upright members including an extension which is connected to a loop shaped member, a first two of said four loop shaped members slidably engaging said first longitudinal member, a second two of said four loop shaped members slidably engaging said second longitudinal member.

13. A submersible raft as set forth in claim 12 wherein each one of said four loop shaped members encircles a longitudinal member.

14. A submersible raft as set forth in claim 12 wherein said cradle is of elongated tubular sections which are joined together by "T" shaped connectors and "L" shaped connectors, respectively.

15. A submersible raft as set forth in claim 14 wherein said elongated tubular sections are of extruded polyvinyl chloride.

16. A submersible raft as set forth in claim 15 wherein said elongated tubular sections define a plurality of drilled apertures such that in use of the raft, said cradle will sink relative said longitudinal members.

17. A submersible raft as set forth in claim 12 wherein said loop shaped members slide longitudinally along said first and said second longitudinal members, respectively.

18. A submersible raft as set forth in claim 1 wherein the length of the upper and the lower frameworks is substantially less than the distance between the longitudinal axes of said first and said second longitudinal members.

19. A submersible raft as set forth in claim 18 wherein said upper framework includes a first and a second removable elongated tubular locking section, said first and said second elongated tubular locking sections extending between lower "T" shaped connectors disposed along said upright members corresponding with said first and said second longitudinal members, respectively.

20. A submersible raft as set forth in claim 19 wherein each of said first and said second locking sections include opposed ends which are connectively received within a socket portion of said lower "T" shaped connectors.

21. A submersible raft as set forth in claim 1 wherein the length of the upper and the lower frameworks is substantially greater than the distance between the longitudinal axes of said first and said longitudinal members, respectively.

22. A submersible raft as set forth in claim 1 wherein said tray includes four solid side walls and a perforate base.

23. A submersible raft as set forth in claim 22 wherein said tray is substantially square in plan view.

24. A submersible raft as set forth in claim 22 wherein said tray is capable of supporting four units.

25. A submersible raft as set forth in claim 24 wherein each of said units includes sixteen pots.

26. A submersible raft as set forth in claim 25 wherein each of said pots within a unit is stapled to an adjacent pot.

27. A submersible raft as set forth in claim 25 wherein each of said pots contains a peat pellet.

28. A submersible raft as set forth in claim 25 wherein each of said units includes a plurality of peat blocks.

29. A submersible raft as set forth in claim 1 wherein said cradle is capable of supporting two trays.

30. A submersible raft as set forth in claim 1 wherein said first and said second longitudinal members are capable of supporting three cradles.

31. A submersible raft as set forth in claim 1 wherein said first and said second longitudinal members and said first and said second transverse members and said cradle are encompassed by a sheet of netting.

* * * * *

Disclaimer 4,487,588—David W. Burleigh, Bognor Regis, England; Waldemar Czernakowski, Blaustein; Hermann Wetter, Ulm, both of Germany. CHILD SAFETY SEAT. Patent dated Jan. 30, 1996. Disclaimer filed August 7, 1998, by the assignee, Britax-Excelsior Limited, England; Britax Romer Kindersicherheit GmbH, Germany.

Hereby enters this disclaimer to claims 1-18 of said patent.

*(Official Gazette*, October 20, 1998)